United States Patent
Zatorski et al.

(10) Patent No.: US 11,255,221 B2
(45) Date of Patent: Feb. 22, 2022

(54) LUBE SYSTEM FOR GEARED TURBINE SECTION

(71) Applicant: General Electric Company, Schenectady, NY (US)

(72) Inventors: Darek Tomasz Zatorski, Fort Wright, KY (US); Christopher Charles Glynn, Clearwater Beach, FL (US)

(73) Assignee: General Electric Company, Schenectady, NY (US)

( * ) Notice: Subject to any disclaimer, the term of this patent is extended or adjusted under 35 U.S.C. 154(b) by 531 days.

(21) Appl. No.: 15/710,261

(22) Filed: Sep. 20, 2017

(65) Prior Publication Data

US 2019/0085725 A1  Mar. 21, 2019

(51) Int. Cl.
| | |
|---|---|
| *F01D 11/00* | (2006.01) |
| *F01D 25/18* | (2006.01) |
| *F02C 3/067* | (2006.01) |
| *F02C 7/06* | (2006.01) |
| *F01D 25/16* | (2006.01) |

(Continued)

(52) U.S. Cl.
CPC .............. *F01D 25/18* (2013.01); *F01D 1/26* (2013.01); *F01D 5/03* (2013.01); *F01D 25/16* (2013.01); *F02C 3/067* (2013.01); *F02C 7/06* (2013.01)

(58) Field of Classification Search
CPC ... F01D 25/18; F01D 1/26; F01D 5/03; F01D 25/16; F02C 3/067; F02C 7/06
USPC ........................................................ 415/111
See application file for complete search history.

(56) References Cited

U.S. PATENT DOCUMENTS

| | | | | |
|---|---|---|---|---|
| 2,551,660 A | * | 5/1951 | Feilden | F01D 25/20 |
| | | | | 184/6.13 |
| 3,170,292 A | * | 2/1965 | Howes | F01D 25/20 |
| | | | | 60/39.08 |

(Continued)

FOREIGN PATENT DOCUMENTS

| | | |
|---|---|---|
| CN | 101413440 A | 4/2009 |
| EP | 1 918 527 A2 | 5/2008 |

(Continued)

OTHER PUBLICATIONS

Canadian Office Action Corresponding to Application No. 3016717 dated Jun. 18, 2019.

(Continued)

*Primary Examiner* — Hung Q Nguyen
*Assistant Examiner* — Anthony Donald Taylor, Jr.
(74) *Attorney, Agent, or Firm* — Dority & Manning, P.A.

(57) ABSTRACT

The present disclosure is directed to a gas turbine engine including a first turbine frame defining one or more first struts extended along a radial direction and a turbine rotor assembly. The turbine rotor assembly defines a rotatable drum surrounding a reduction speed reduction assembly and coupled thereto. The turbine rotor assembly includes a first turbine rotor and a second turbine rotor each disposed on one or more bearing assemblies. The first turbine frame defines a first supply conduit through the first strut providing a flow of fluid to the speed reduction assembly and one or more of the bearing assemblies. The first turbine frame further defines a first scavenge conduit providing an egress of at least a portion of the flow of fluid from one or more of the bearing assemblies.

20 Claims, 2 Drawing Sheets

(51) Int. Cl.
*F01D 5/03* (2006.01)
*F01D 1/26* (2006.01)

(56) References Cited

U.S. PATENT DOCUMENTS

| | | | |
|---|---|---|---|
| 3,248,880 A * | 5/1966 | Hull, Jr. | F01D 25/18 60/39.08 |
| 3,528,241 A * | 9/1970 | Gill, Jr. | F01D 25/18 60/39.08 |
| 3,618,710 A * | 11/1971 | DeLisse | F01D 25/20 184/6.11 |
| 3,703,081 A * | 11/1972 | Krebs | F01D 5/06 60/226.1 |
| 3,704,075 A * | 11/1972 | Karstensen | F01D 9/041 415/68 |
| 3,844,110 A * | 10/1974 | Widlansky | F02C 7/06 60/39.08 |
| 3,861,139 A * | 1/1975 | Jones | F02C 3/067 60/226.1 |
| 5,079,916 A | 1/1992 | Johnson | |
| 5,107,676 A * | 4/1992 | Hadaway | F01D 25/18 184/6.11 |
| 5,272,868 A | 12/1993 | Ciokajlo et al. | |
| 7,296,398 B2 * | 11/2007 | Moniz | F01D 1/26 60/226.1 |
| 7,451,592 B2 | 11/2008 | Taylor et al. | |
| 7,490,461 B2 | 2/2009 | Moniz et al. | |
| 7,959,532 B2 * | 6/2011 | Suciu | F01D 5/022 475/331 |
| 8,083,030 B2 * | 12/2011 | Portlock | F01D 5/022 184/6 |
| 8,191,352 B2 | 6/2012 | Schilling | |
| 8,756,908 B2 | 6/2014 | Sheridan et al. | |
| 8,997,500 B2 | 4/2015 | Glahn et al. | |
| 9,995,176 B2 | 6/2018 | Belmonte et al. | |
| 2005/0199445 A1 * | 9/2005 | Zalewski | F01D 9/065 184/6.5 |
| 2007/0193276 A1 * | 8/2007 | Corattiyil | F02C 7/06 60/782 |
| 2008/0098716 A1 * | 5/2008 | Orlando | F01D 15/12 60/226.1 |
| 2014/0174858 A1 * | 6/2014 | Remer | F02C 7/06 184/106 |
| 2014/0182972 A1 * | 7/2014 | Hetherington | F02C 7/06 184/6.11 |
| 2015/0308351 A1 | 10/2015 | Sheridan | |
| 2015/0330250 A1 * | 11/2015 | Scott | F01D 9/065 415/177 |
| 2017/0198605 A1 | 7/2017 | Vielcanet et al. | |
| 2018/0051706 A1 * | 2/2018 | DiBenedetto | F01D 25/162 |

FOREIGN PATENT DOCUMENTS

| | | | |
|---|---|---|---|
| EP | 2 746 542 A2 | 6/2014 | |
| JP | S51127914 | * 11/1976 | F02C 7/36 |
| WO | 2014/022150 A1 | 2/2014 | |

OTHER PUBLICATIONS

Extended European Search Report and Opinion issued in connection with corresponding EP Application No. 18193680.8 dated Jan. 2, 2019.

* cited by examiner

LUBE SYSTEM FOR GEARED TURBINE SECTION

FIELD

The present subject matter relates generally to gas turbine engine architecture. More particularly, the present subject matter relates to a lube system for a geared turbine section.

BACKGROUND

Gas turbine engines generally include a turbine section downstream of a combustion section that is rotatable with a compressor section to rotate and operate the gas turbine engine to generate power, such as propulsive thrust. General gas turbine engine design criteria often include conflicting criteria that must be balanced or compromised, including increasing fuel efficiency, operational efficiency, and/or power output while maintaining or reducing weight, part count, and/or packaging (i.e. axial and/or radial dimensions of the engine).

Conventional direct drive gas turbine engines include a bladed rotor assembly connected to a fan assembly via a shaft, such as a low pressure turbine coupled to a low pressure shaft. Counter-rotating turbine assemblies include two or more bladed rotor assemblies coupled to a fan assembly via a reversing speed reduction device (e.g. gearbox). However, counter-rotating turbine assemblies require lube and air supply and scavenge arrangements unlike known direct drive turbine assemblies or geared engine arrangements.

As such, there is a need for a lube system arrangement for a geared turbine section to supply and scavenge lube and air at the bearing assemblies and the speed reduction device. Still further, there is a need for a lube system arrangement for a geared turbine section that improves access, inspection, and maintainability of the lube system, the bearing assemblies, and the speed reduction device versus known gas turbine engines incorporating speed reduction devices.

BRIEF DESCRIPTION

Aspects and advantages of the invention will be set forth in part in the following description, or may be obvious from the description, or may be learned through practice of the invention.

The present disclosure is directed to a gas turbine engine including a first turbine frame defining one or more first struts extended along a radial direction and a turbine rotor assembly. The turbine rotor assembly defines a rotatable drum surrounding a reduction speed reduction assembly and coupled thereto. The turbine rotor assembly includes a first turbine rotor and a second turbine rotor each disposed on one or more bearing assemblies. The first turbine frame defines a first supply conduit through the first strut providing a flow of fluid to the speed reduction assembly and one or more of the bearing assemblies. The first turbine frame further defines a first scavenge conduit providing an egress of at least a portion of the flow of fluid from one or more of the bearing assemblies.

In various embodiments, the engine further includes a second turbine frame defining one or more second struts extended along a radial direction. The second turbine frame defines a second scavenge conduit providing an egress of at least a portion of the flow of fluid from one or more of the bearing assemblies and the speed reduction assembly. The second turbine frame further defines a second pressure supply conduit providing pressurized gas therethrough.

In one embodiment, the first turbine frame further defines a first pressure supply conduit extended at least partially therethrough.

In still various embodiments, the second turbine frame and the rotatable drum of the turbine rotor assembly together define a forward seal assembly, an aft seal assembly, and a first cavity between the forward seal assembly and the aft seal assembly between an inner diameter of the second turbine frame and the drum of the turbine rotor assembly. In one embodiment, the forward seal assembly and the aft seal assembly each define a high pressure side outside of the first cavity and a low pressure side inside the first cavity, and wherein the second pressure supply conduit provides pressurized gas to the high pressure side outside the first cavity.

In still yet various embodiments, the rotatable drum of the turbine rotor assembly defines a first longitudinal portion at least partially circumferentially surrounding the speed reduction assembly. The first longitudinal portion defines a first opening therethrough providing fluid communication from one or more of the speed reduction assembly and the bearing assemblies to the first cavity between the forward seal assembly and the aft seal assembly. In one embodiment, the first opening in the first longitudinal portion of the drum defines an inner diameter opening, an outer diameter opening, and an opening passage therebetween. In another embodiment, the inner diameter opening is defined at a different circumferential position along the first longitudinal portion of the drum relative to the outer diameter opening, defining an at least partially circumferential or tangential opening passage therebetween.

In various embodiments, the forward seal assembly defines a first forward seal and a second forward seal. The first forward seal is forward of the second forward seal and a forward seal cavity is defined therebetween. In one embodiment, the first turbine rotor of the turbine rotor assembly includes a rotatable frame. The rotatable frame includes a plurality of radially extended members and an outer shroud extended along the longitudinal direction. A plurality of outer shroud airfoils is extended inward along the radial direction from the outer shroud. The rotatable drum is coupled to the first turbine rotor. In another embodiment, the rotatable drum further defines a second longitudinal portion coupled to an output component of the speed reduction assembly.

In still various embodiments, a third cavity is defined between rotatable drum and the speed reduction assembly. In one embodiment, the second turbine rotor of the turbine rotor assembly defines an input shaft coupled to an input component of the speed reduction assembly. In another embodiment, the second turbine rotor defines a third longitudinal portion. The third longitudinal portion defines a third opening defined therethrough. The third opening providing fluid communication from the third cavity to the bearing assembly disposed between the rotatable drum and the second turbine rotor. In still another embodiment, the engine defines a second cavity between the first longitudinal portion of the drum and the third longitudinal portion of the second turbine rotor, and between one or more bearing assemblies disposed therebetween. The second cavity is in fluid communication with the first cavity via a first opening defined through the first longitudinal portion of the drum.

In still yet various embodiments, the second turbine rotor further defines a fourth longitudinal portion defined radially adjacent to an annular shroud of the first turbine frame. One or more bearing assemblies are coupled to the annular shroud and the fourth longitudinal portion and disposed therebetween. In one embodiment, the first turbine frame further defines a lube housing assembly extended along the longitudinal direction radially inward of the fourth longitudinal portion and the speed reduction assembly. A fourth cavity is defined between the inner lube housing assembly, the speed reduction assembly, and the fourth longitudinal portion of the second turbine rotor. The fourth longitudinal portion defines a fourth opening defined therethrough. The fourth opening providing fluid communication from the fourth cavity to the bearing assembly disposed between the first turbine frame and the fourth longitudinal portion of the second turbine rotor.

In another embodiment, a fifth cavity is defined between an annular shroud of the first turbine frame, the fourth longitudinal portion of the second turbine rotor, and the one or more bearing assemblies therebetween, and wherein the first scavenge conduit is defined from the fifth cavity and through one or more struts of the first turbine frame.

In various embodiments, the first turbine frame defines an annular shroud extended at least partially along the longitudinal direction. The annular shroud defines a first pressure supply passage therewithin. The annular shroud defines an annular shroud opening adjacent to a sixth cavity defined between the second turbine rotor and the first turbine frame between one or more first seal interfaces, the annular shroud opening providing fluid communication between the first pressure supply passage and the sixth cavity. In one embodiment, the second turbine rotor defines a second pressure supply plenum therewithin. The second pressure supply plenum is extended from a rotating seal interface at the first rotor pressure supply opening to the sixth cavity defined between second turbine rotor and the first turbine frame between one or more of the first seal interface.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows. Unless otherwise stated, "downstream" and "upstream" refer to the general direction of fluid flow of air or resulting combustion gases through a core flowpath of the engine from entry in the compressor section through exit from a turbine section.

A lube system arrangement for an engine including a counter rotating turbine rotor assembly with a reversing speed reduction assembly is generally provided. The lube system arrangement provides a flow of lubricant to the pluralities of bearing assemblies and the speed reduction assembly via a single turbine frame. The lube system arrangement shown and described herein enables operation of interdigitated counter-rotating turbine rotor assemblies. The lube system arrangement further provides improved maintainability, inspection, installation, and access relative to known lube arrangements for gas turbine engines incorporating speed reduction assemblies.

Various embodiments of the engine including the interdigitated turbine section shown and described herein may increase fuel efficiency, operational efficiency, and/or power output while reducing weight, part count, and/or packaging (e.g. radial and/or axial dimensions). For example, the interdigitated turbine section may enable a fan assembly to operate at an increased bypass ratio and/or enable the gas turbine engine to operate at an increased overall pressure ratio, thereby increasing fuel efficiency, operational efficiency, and/or power output relative to other engines of similar power output and/or packaging. The interdigitated turbine section may further reduce stationary and/or rotating airfoil quantities, and thereby engine packaging and/or weight, while maintaining or improving efficiencies, performance, or power output. Still further, the interdigitated turbine section may reduce a product of axial flow area and the square of the rotational speed (the product referred to as "$AN^2$") relative to an engine incorporating a reduction speed reduction assembly, while additionally reducing an average work factor per stage of the turbine section.

Figure 1:
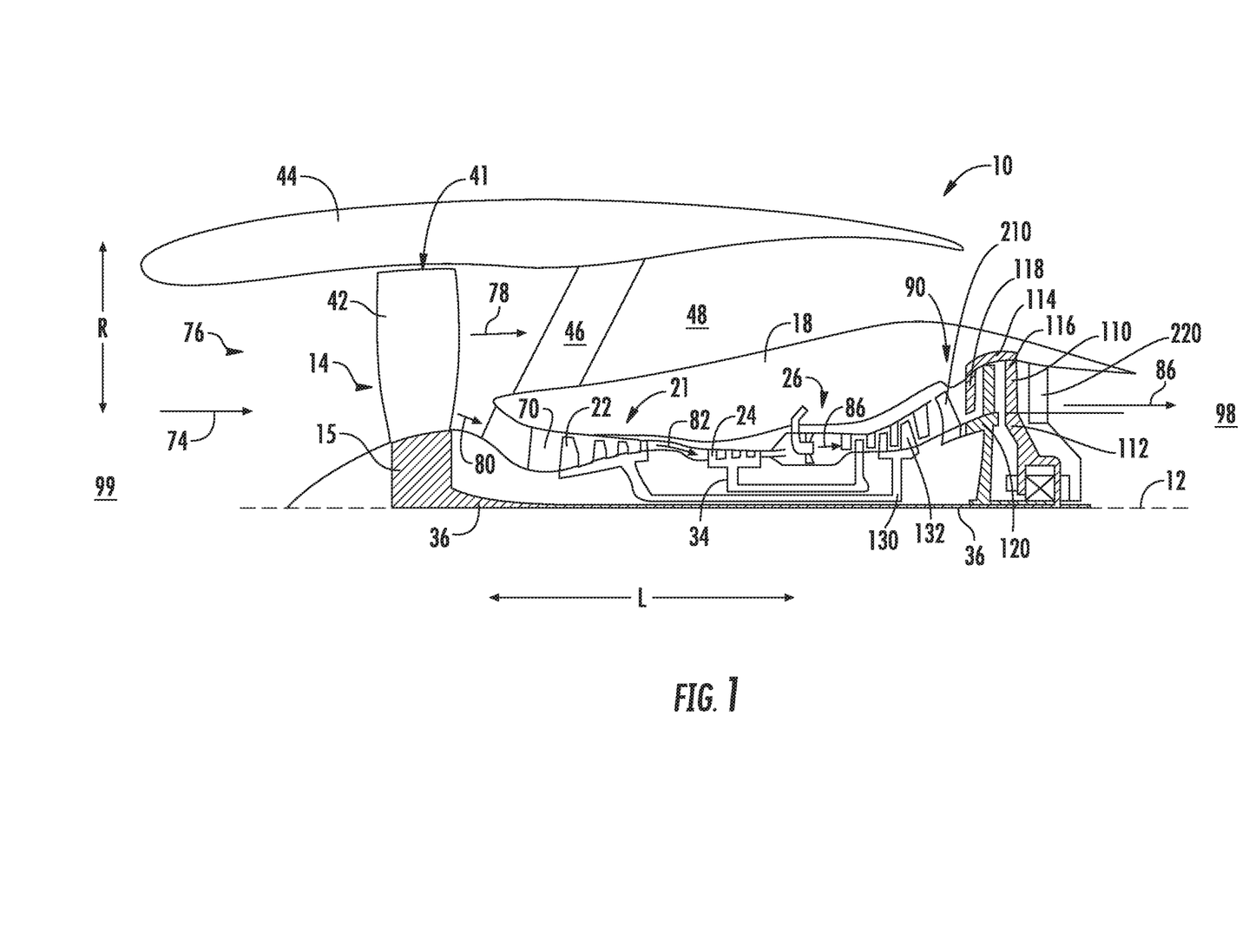
FIG. 1 is a schematic cross sectional view of an exemplary gas turbine engine incorporating an exemplary embodiment of a turbine section and reduction speed reduction assembly according to an aspect of the present disclosure.

Referring now to the drawings, FIG. 1 is a schematic cross sectional view of an exemplary gas turbine engine 10 (herein referred to as "engine 10"), shown as a turbofan engine, incorporating an exemplary embodiment of a turbine section 90 according to an aspect of the present disclosure. Although further described below with reference to a turbofan engine, the present disclosure is also applicable to turbomachinery in general, including propfan, turbojet, turboprop, and turboshaft gas turbine engines, including marine and industrial turbine engines and auxiliary power units. As shown in FIG. 1, the engine 10 has a longitudinal or axial centerline axis 12 that extends there through for reference purposes. The engine 10 defines a longitudinal direction L, a radial direction R, and an upstream end 99 and a downstream end 98 along the longitudinal direction L.

In general, the engine 10 may include a substantially tubular outer casing 18 that defines an annular inlet. The outer casing 18 encases or at least partially flows, in serial flow arrangement, a compressor section 21, a combustion section 26, and an interdigitated turbine section 90 (herein referred to as "turbine section 90"). In the embodiment shown in FIG. 1, the compressor section 21 defines a high pressure compressor (HPC) 24 coupled to a high speed shaft 34. The compressor section 21 further defines a booster 22, such as defining a low pressure compressor (LPC) or intermediate pressure compressor (IPC) in serial arrangement with the HPC 24.

In various embodiments, the booster 22 is coupled to a driveshaft 36, such as to define a low speed shaft. The booster 22 is driven by energy extracted from combustion gases 86 at the turbine section 90 by one or more turbine rotors. In one embodiment, the driveshaft 36 is coupled to the booster 22 at the compressor section 21, and further coupled to a turbine rotor assembly 95 at the turbine section 90, such as further shown and described in regard to FIG. 2. In still various embodiments, the driveshaft 36 is further coupled to a fan assembly 14. As such, the turbine rotor assembly 95 (FIG. 2) drives the booster 22 and the fan assembly 14.

In other embodiments, the booster 22 is coupled to an intermediate speed shaft. The intermediate speed shaft is coupled to an intermediate speed turbine rotor at the turbine section, such as to define a three spool engine configuration. In various embodiments, the driveshaft 36 may be coupled to the fan assembly 14. It should be appreciated that the engine 10 may be configured as a two-spool engine (e.g., defining a high speed spool and a low speed spool), or as a three- or more spool engine (e.g., defining a high speed spool, a low speed spool, and one or more intermediate speed spools).

The fan assembly 14 is disposed forward or upstream 99 of the compressor section 21. The fan assembly 14 includes a fan rotor 15. The fan rotor 15 includes one or more fan stages 41, in which each fan stage 41 defines a plurality of blades 42 that are coupled to and extend outwardly from the fan rotor 15 in the radial direction R. In one embodiment as shown in FIG. 1, the fan rotor 15 defines a single fan stage or single circumferentially adjacent arrangement of the plurality of blades 42. In various other embodiments, the fan assembly 14 may further define a plurality of the stages 41. The fan rotor 15 are together rotatable about the axial centerline 12. An annular fan casing or nacelle 44 circumferentially surrounds at least a portion of the fan assembly 14 and/or at least a portion of the outer casing 18. In one embodiment, the nacelle 44 may be supported relative to the outer casing 18 by a plurality of circumferentially-spaced outlet guide vanes or struts 46. At least a portion of the nacelle 44 may extend over an outer portion (in radial direction R) of the outer casing 18 so as to define a bypass airflow passage 48 therebetween.

Figure 2:
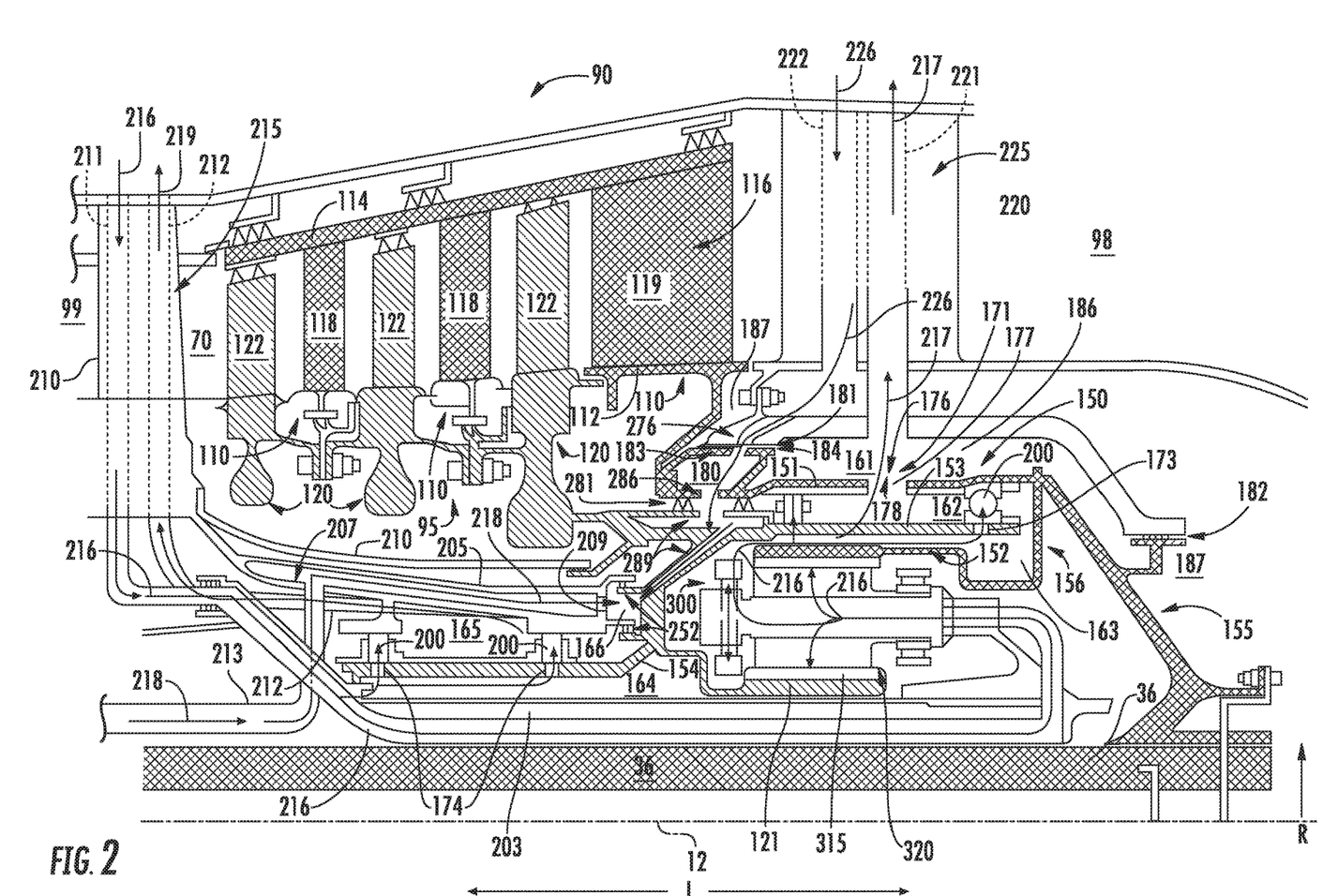
FIG. 2 is a schematic cross sectional view of an embodiment of the turbine section and reduction speed reduction assembly shown in FIG. 1.

During operation of the engine 10, as shown in FIGS. 1-2 collectively, a volume of air as indicated schematically by arrows 74 enters the engine 10 through an associated inlet 76 of the nacelle and/or fan assembly 14. As the air 74 passes across the blades 42 of the fan assembly 14, a portion of the air as indicated schematically by arrows 78 is directed or routed into the bypass airflow passage 48 while another portion of the air as indicated schematically by arrows 80 is directed or through the fan assembly 14. Air 80 is progressively compressed as it flows through the compressor section 21 toward the combustion section 26.

The now compressed air, as indicated schematically by arrows 82, flows into the combustion section 26 where a fuel is introduced, mixed with at least a portion of the compressed air 82, and ignited to form combustion gases 86. The combustion gases 86 flow into the turbine section 90, causing rotary members of the turbine section 90 to rotate and support operation of respectively coupled rotary members in the compressor section 21 and/or fan assembly 14.

Referring now to FIG. 2, an exemplary embodiment of the turbine section 90 of the engine 10 is generally provided. The turbine section 90 includes a turbine rotor assembly 95. The turbine rotor assembly 95 includes at least a first turbine rotor 110 disposed in alternating arrangement along the longitudinal direction L (i.e., interdigitated) with a second turbine rotor 120. The first turbine rotor 110 includes a rotatable frame 119. The rotatable frame 119 includes a plurality of radially extended structural members 116. In various embodiments, the radially extended structural members 116 each define an airfoil defining a pressure side, a suction side, a leading edge, and a trailing edge. The structural members 116 defining airfoils extract energy from the combustion gases 86 to induce rotation of the first turbine rotor 110.

An outer shroud 114 is extended along the longitudinal direction L from an outer diameter of the rotatable frame 119. The plurality of outer shroud airfoils 118 is extended inward along the radial direction R from the outer shroud 114. The outer shroud 114 is annular around the axial centerline 12, such as to define a rotor or drum rotor to which the plurality of outer shroud airfoils 118 is attached. The rotatable frame 119 provides structural support, such as along the axial, radial, and circumferential or tangential directions to the outer shroud 114 and airfoils 118. In various embodiments, such as generally provided in FIGS. 1-2, the outer shroud 114 is cantilevered from the rotatable frame 119 and surrounding the second turbine rotor 120. In other embodiments not shown, the outer shroud 114 may be coupled to another rotatable frame 119 (e.g., a rotatable frame 119 at an upstream end and a downstream end of the outer shroud 114) or otherwise supported by a bearing assembly.

The second turbine rotor 120 includes a plurality of second turbine rotor airfoils 122 extended outward along the radial direction R. The plurality of second turbine rotor airfoils 122 is disposed in alternating arrangement along the longitudinal direction L with the plurality of outer shroud airfoils 118 of the first turbine rotor 110. The first turbine rotor 110 rotates in a first direction around the axial centerline 12 at a first speed. The second turbine rotor 120 rotates in a second direction opposite of the first direction and at a second speed different from the first speed. As such, the turbine rotor assembly 95 defines a counter-rotating turbine rotor assembly.

In the embodiment generally provided in FIG. 2, the outer shroud 114 is extended from the rotatable frame 119 toward the upstream end 99 generally along the longitudinal direction L. The second turbine rotor 120 is disposed generally upstream of the rotatable frame 119. In other embodiments, the rotatable frame 119 may be disposed forward or upstream of the second turbine rotor 120. The outer shroud 114 may extend aft or downstream from the rotatable frame 119 toward the downstream end 98 generally along the longitudinal direction.

Referring still to FIGS. 1-2, the turbine section 90 further includes a speed reduction assembly 300. In various embodiments, the speed reduction assembly 300 defines a gear assembly, such as a reduction gearbox or power gearbox, or a hydraulic or pneumatic speed reduction assembly, or another suitable speed reduction device. In one embodiment, the speed reduction device 300 defines a reversing reduction gear assembly. In various embodiments, the speed reduction device 300 defines a reversing compound gear assembly. The speed reduction assembly 300 includes an input component 310, an output component 320, and a speed change component 315. The input component 310 defines one or more of a gear, a gear mesh, or other interfacing mesh to which the second turbine rotor 120 is coupled and provides mechanical energy to the speed reduction assembly 300. The output component 320 defines one or more of a gear, a gear mesh, or other interfacing mesh to which the first turbine rotor 110 is coupled.

In various embodiments, the speed reduction assembly 300 defines a range of speed reduction ratios between the second speed (e.g., at the second turbine rotor 120) and the first speed (e.g., at the first turbine rotor 110). In one embodiment, the speed reduction assembly 300 defines a range of speed reduction ratios of about 1.5:1 to about 3:1. In another embodiment, the speed reduction assembly 300 defines a range of speed reduction ratios of about 1.8:1 to about 2.8:1. For example, the second turbine rotor 120 rotates at a second speed approximately 1.5 times to approximately 3.0 times greater than the first turbine rotor 110 at a first speed. As another example, the second turbine rotor 120 rotates at a second speed approximately 1.8 times to approximately 2.8 times greater than the first turbine rotor 110 at a first speed. In various embodiments, the second turbine rotor 120 and the first turbine rotor 110 rotate at generally proportional speeds relative to one another. Still further, in various embodiments, the second turbine rotor 120 rotates in a second direction opposite of the first turbine rotor 110 in a first direction around the axial centerline 12.

In various embodiments, the first turbine rotor 110 includes a rotatable drum 150. The rotatable drum 150 is coupled to the rotatable frame 119 and to a driveshaft 36. The driveshaft 36 is extended along the longitudinal direction L. For example, the driveshaft 36 may define a low speed shaft extended from the turbine rotor assembly 95 to the fan assembly 14 (FIG. 1), in which the turbine rotor assembly 95 provides energy or force to drive the fan rotor 15 of the fan assembly 14. The rotatable drum 150 is surrounds the speed reduction assembly 300 such as to define, at least in part, a housing around the speed reduction assembly 300. The rotatable drum 150 may be defined generally annularly around the axial centerline 12 around the speed reduction assembly 300.

In various embodiments, the rotatable drum 150 transfers energy from the second turbine rotor 120 through the speed reduction device 300 to the driveshaft 36. In one embodiment, the rotatable drum 150 defines a first longitudinal portion 151 at least partially circumferentially surrounding the speed reduction assembly 300. The first longitudinal portion 151 is coupled to the rotatable frame 119 at a first end and to a radial member 155 at a second end. The radial member 155 of the rotatable drum 150 is extended to and coupled to the driveshaft 36. In various embodiments, the radial member 155 of the drum 150 defines a flexible coupling between the driveshaft 36 and the first longitudinal portion 151 of the rotatable drum 150. For example, the radial member 155 may define a spring or springing properties that may enable bending, twisting, flexing, etc. of the radial member 155. As such, the radial member 155 may be configured to compensate for variations or lags in loading, rotational speed or position (e.g., hysteresis) between the fan assembly 14, the driveshaft 36, the speed reduction assembly 300, and the first turbine rotor 110.

In still various embodiments, the rotatable drum 150 further defines a second longitudinal portion 152. The second longitudinal portion 152 is coupled to the output component 320 of the speed reduction assembly 300. The second longitudinal portion 152 is coupled to one or more of the first longitudinal portion 151 and the radial member 155 of the rotatable drum 150 via a radial portion 156. In various embodiments, the radial portion 156 may further define a flexible coupling such as described in regard to the radial member 155.

Referring still to FIG. 2, the second turbine rotor 120 further defines an input shaft 121 coupled to the input component 310 of the speed reduction assembly 300. During operation of the engine 10, the second turbine rotor 120 extracts energy from the combustion gases 86 flowing through a core flowpath 70 to induce rotation of the second turbine rotor 120 around the axial centerline 12. The input shaft 121 of the second turbine rotor 120 provides energy to the speed reduction assembly 300 through the input component 310. The second turbine rotor 120 generally rotates generally around the axial centerline 12 at a second speed greater than the first speed of the first turbine rotor 110. Energy from the second turbine rotor 120 transmitted to the output component 320 is further transferred to the driveshaft 36 via the rotatable drum 150 of the first turbine rotor 110.

The first turbine rotor 110 and the second turbine rotor 120 together provide energy to rotate the driveshaft 36 and one or more of the fan assembly 14 and booster 22. In various embodiments, the first turbine rotor 110 provides between approximately 25% to approximately 75% of torque to the driveshaft 36. In another embodiment, the second turbine rotor 120 provides between approximately 30% to approximately 60% of torque to the driveshaft 36.

Still further, the arrangement of the turbine rotor assembly 95 to the speed reduction assembly 300 and driveshaft 36 mitigates various failure modes relative to speed reduction assemblies in gas turbine engines. For example, the engine 10 including embodiments of the turbine section 90 generally shown and described herein defines a direct drive engine arrangement from the fan assembly 14 (FIG. 1) to the first turbine rotor 110 of the turbine rotor assembly 95 via the driveshaft 36. The engine 10 further defines an indirect drive engine arrangement from the second turbine rotor 120 to the fan assembly 14 (FIG. 1) via the driveshaft 36. As such, the fan rotor 15 of the fan assembly 14 may continue to receive energy from the turbine rotor assembly 95 via the first turbine rotor 110 following failure of the second turbine rotor 120, the speed reduction assembly 300, or both.

As another example, the engine 10 shown and described herein enables relatively smaller or more compact speed reduction assemblies 300 as less than 100% of the torque from the turbine rotor assembly 95 is transmitted through the speed reduction assembly 300 to the fan assembly 14.

In various embodiments, the second turbine rotor 120 defines a third longitudinal portion 153. The third longitudinal portion 153 at least partially circumferentially surrounds the speed reduction assembly 300 and is disposed between the first longitudinal portion 151 and the second longitudinal portion 152 of the rotatable drum 150.

Referring still to FIG. 2, the turbine section 90 further includes a first turbine frame 210. The first turbine frame 210 defines one or more first struts 215 extended generally along the radial direction R between an outer diameter and an inner diameter of the engine 10. The one or more first struts 215 may be disposed in circumferential arrangement around the axial centerline 12. The first turbine frame 210 defines a first supply conduit 211 through the first strut 215. The first supply conduit 211 provides a flow of fluid (e.g., oil, lubricant, etc.), shown schematically by arrows 216, to the speed reduction assembly 300 and one or more bearing assemblies 200 in the turbine section 90.

The first turbine frame 210 further defines a first scavenge conduit 212 through the first strut 215. The first scavenge conduit 212 provides an outlet or egress of a flow of fluid (e.g., oil, lubricant, etc.), shown schematically by arrows 219, from the one or more bearing assemblies 200, the speed reduction assembly 300, or both.

In various embodiments, the first supply conduit 211 and the first scavenge conduit 212 each define walled conduits. In one embodiment, the first supply conduit 211 and first scavenge conduit 212 is defined within the first turbine frame 210 via an additive manufacturing process, machining process, or combinations of both. For example, the first turbine frame 210 defines hollow passages through which the fluid 216, 219 flows. In another embodiment, the first turbine frame 210 further includes walled tubes or manifolds extended through the first strut 215 and the first turbine frame 210.

Referring to FIG. 2, the turbine section 90 includes one or more bearing assemblies 200. In various embodiments, the bearing assembly 200 is disposed between a static and rotating structure, such as between the first turbine frame 210 and the second turbine rotor 120, and between the second turbine frame 220 and the first turbine rotor 110. In still various embodiments, the bearing assembly 200 is disposed between a rotating-to-rotating structure, such as to define a differential bearing between the first turbine rotor 110 and the second turbine rotor 120. The bearing assembly 200 may define one or more of a roller bearing, a tapered roller bearing, a ball or thrust bearing, a fluid film bearing, or an air bearing.

In various embodiments, one or more bearing assemblies 200 is disposed between the third longitudinal portion 153 of the second turbine rotor 120 and the first longitudinal portion 151 of the first turbine rotor 110. In one embodiment, one bearing assembly 200 between the third longitudinal portion 153 and the first longitudinal portion 151 is defined as a bearing configured to provide radial support, such as a roller bearing. Another bearing assembly 200 between the third longitudinal portion 153 and the first longitudinal portion 151 is defined as a bearing configured to provide radial and axial or longitudinal support, such as a ball or thrust bearing. In another embodiment, each bearing assembly 200 between the third longitudinal portion 153 and the first longitudinal portion 151 defines a tapered roller bearing.

Referring still to FIG. 2, the first supply conduit 211 is extended to and in fluid communication with the speed reduction assembly 300, providing the flow of fluid 216 thereto. In various embodiments, the speed reduction assembly 300, the rotatable drum 150 of the first turbine rotor 110, and the second turbine rotor 120 together define a third cavity 163. In one embodiment, the third cavity 163 is further defined between the first longitudinal portion 151 and the second longitudinal portion 152 of the rotatable drum 150. In another embodiment, the third cavity 163 is further defined between the radial portion 156 of the rotatable drum 150. In still another embodiment, the third cavity 163 is defined between the third longitudinal portion 153 of the second turbine rotor 120, and the first and second longitudinal portions 151, 152 of the first turbine rotor 110.

In still yet another embodiment, the third cavity 163 is further defined between one or more bearing assemblies 200, the rotatable drum 150 of the first turbine rotor 110, the second turbine rotor 120, and the speed reduction assembly 300.

The flow of fluid 216 (e.g., oil, lubricant, etc.) egresses from the speed reduction assembly 300 into the third cavity 163. In various embodiments, the second turbine rotor 120 defines one or more third openings 173 therethrough providing fluid communication from the third cavity 163 to one or more bearing assemblies 200. For example, the third opening 173 may be defined through the third longitudinal portion 153 of the second turbine rotor 120 to enable the flow of fluid 216 to the bearing assemblies 200 between the second turbine rotor 120 and the first turbine rotor 110.

In still various embodiments, the rotatable drum 150 and the second turbine rotor 120 together define a second cavity 162 therebetween. For example, the second cavity 162 may be further disposed between the bearing assemblies 200. In one embodiment, the third opening 173 defined through the second turbine rotor 120 provides fluid communication between the third cavity 163 and the second cavity 162. The third opening 173 enables flow of fluid 216 from the speed reduction assembly 300 through the third cavity 163 and the second cavity 162.

Referring still to FIG. 2, the turbine section 90 may further include a second turbine frame 220. The second turbine frame 220 includes one or more second struts 225 extended generally along the radial direction R from an inner diameter to an outer diameter of the engine 10. In the embodiment generally provided in FIG. 2, the second turbine frame 220 at least partially surrounds the rotatable drum 150 and the speed reduction assembly 300.

The first turbine frame 210 and the second turbine frame 220 each define static structures including one or more seal assemblies. In various embodiments, the second turbine frame 220 and the rotatable drum 150 of the first turbine rotor 110 together define a forward seal assembly 181 and an aft seal assembly 182. The forward seal assembly 181 is defined generally upstream or forward of the aft seal assembly 182. A first cavity 161 is defined between the forward seal assembly 181 and the aft seal assembly 182. The forward seal assembly 181 and the aft seal assembly 182 together define a relatively lower pressure first cavity 161 therebetween, such as to define a lower pressure side shown schematically at 186. Additionally, the forward seal assembly 181 and the aft seal assembly 182 together define a high pressure or relatively higher pressure side outside of the first cavity 161 in contrast to the first cavity 161, such as shown schematically at 187.

The rotatable drum 150 of the first turbine rotor 110 may further define a first opening 171 therethrough providing fluid communication between the first cavity 161 and the second cavity 162. In one embodiment, the first opening 171 is defined through the first longitudinal portion 151 of the rotatable drum 150. In various embodiments, the first opening 171 defines a plurality of openings through the rotatable drum 150 in circumferential arrangement. In still various embodiments, the first opening 171 defines an outer diameter opening 176, an inner diameter opening 178, and an opening passage 177 therebetween.

In one embodiment, the outer diameter opening 176 is defined at a different circumferential position or location along the rotatable drum 150 relative to the inner diameter opening 178. The opening passage 177 therebetween is defined at least partially along the circumferential or tangential direction. During operation of the engine 10, the drum 150 rotates around the axial centerline 12. The different relative circumferential positions of the outer diameter opening 176 and inner diameter opening 178 promote a tangential flow component of a flow of fluid 217 (e.g., oil, lubricant, etc.) egressing the first cavity 161. The flow of fluid 217 generally depicts the egress of the flow of fluid 216 from the speed reduction assembly 300 and bearing assemblies 200 through one or more second scavenge conduits 221 defined through the second turbine frame 220. The tangential flow component of the flow of fluid 217 may promote movement of the flow of fluid 217 from the rotating drum 150 to and through the second scavenge conduit 221 through the static second turbine frame 220.

In various embodiments, the second turbine frame 220 defines a second pressure supply conduit 222 extended through one or more second struts 215 of the second turbine frame 220. The second pressure supply conduit 222 provides a flow and pressure of gas, such as compressed air (e.g., compressed air 82 from the compressor section 21), shown schematically by arrows 226, to the seal assemblies and cavities defined within the turbine section 90. For example, the second pressure supply conduit 222 may provide a relatively higher pressure flow of gas 226 to define the higher pressure side 187 relative to the first cavity 161. As such, the flow of gas 226 may prevent leakage of fluid 216, 217 across the forward seal assembly 181 and aft seal assembly 182. Furthermore, the flow of gas 226 may enable generally retaining the fluid 216, 217 within the third cavity 163, the second cavity 162, and the first cavity 161.

The second scavenge conduit 221 and the second pressure supply conduit 222 of the second turbine frame 220 may each be defined similarly as described in regard to various embodiments of the first supply conduit 211 and the first scavenge conduit 212. For example, the conduits 221, 222 may be formed within the second turbine frame 220 by one or more of an additive manufacturing or machining process, or defined by walled conduits, tubes, manifolds, etc., or combinations thereof.

In various embodiments, the second pressure supply conduit 222 further defines a second supply conduit opening 276 at the forward seal assembly 181. In one embodiment, the forward seal assembly 181 defines a first forward seal 183 and a second forward seal 184. The first forward seal 183 is forward (e.g., forward along the longitudinal direction L, or toward the upstream end 99) of the second forward seal 184.

In still various embodiments, a forward seal cavity 180 is defined between the first forward seal 183 and the second forward seal 184. In one embodiment, the forward seal cavity 180 is extended from adjacent to the second supply conduit opening 276 at the forward seal assembly 181 to a rotating seal interface 281 defined at an interface of the second turbine rotor 120 and first turbine rotor 110. The rotating seal interface 281 defines a rotating-to-rotating to seal between the second turbine rotor 120 and the first turbine rotor 110.

In one embodiment, a first rotor pressure supply opening 286 is defined through the first turbine rotor 110 at the rotating seal interface 281. In various embodiments, the rotating seal interface 281 defines one or more seals, in which the first rotor pressure supply opening 286 is disposed between the pluralities of seals such as to mitigate a pressure loss of the flow of gas 226 flowing through the forward seal cavity 180.

Referring still to FIG. 2, in various embodiments, the second turbine rotor 120 defines a second pressure supply plenum 289 within the second turbine rotor 120. The second pressure supply plenum 289 is extended from the rotating seal interface 281 at the first rotor pressure supply opening 286 to a sixth cavity 166. The sixth cavity 166 is defined between second turbine rotor 120 and the first turbine frame 210 between a first seal interface 282. The first seal interface 282 defines a static-to-rotating seal interface between the first turbine frame 210 and the second turbine rotor 120.

In yet another embodiment of the engine 10, the first turbine frame 210 further defines a first pressure supply conduit 213. The first pressure supply conduit 213 provides a flow of gas, shown schematically by arrows 218, to the sixth cavity 166 defined between the second turbine rotor 120 and the first turbine frame 210. In one embodiment, the first turbine frame 210 may define the first pressure supply conduit 213 though the first strut 215. In various embodiments, the flow of gas 218 is provided from the compressor section 21 of the engine 10. Similarly as shown and described in regard to the first supply conduit 211 and the first scavenge conduit 212, the first pressure supply conduit 213 may be formed by one or more of an additive manufacturing process, machining process, or combinations thereof, or via a walled conduit, tube, manifold, etc.

In various embodiments, the engine 10 defines, at least in part, a gas conduit via the first pressure supply conduit 213 to the sixth cavity 166. In one embodiment, the gas conduit is further defined, at least in part, via the second pressure supply conduit 222 through the second pressure supply plenum 289 to the sixth cavity 166.

In one embodiment of the engine 10, the first turbine frame 210 defines an annular shroud 205 extended at least partially along the longitudinal direction L. The annular shroud 205 defines a first pressure supply passage 207 therewithin. The annular shroud 205 is defined generally circumferentially around the axial centerline 12. In one embodiment, the first pressure supply passage 207 defines a plurality of discrete hollow passages through the first turbine frame 210, such as bores. In another embodiment, the first pressure supply passage 207 is defined at least partially circumferentially through the annular shroud 205 of the first turbine frame 210. The annular shroud 210 further defines at the first pressure supply passage 207 an annular shroud opening 209 adjacent to the sixth cavity 166. The annular shroud opening 209 permits fluid communication of the flow of gas 218 through the first pressure supply passage 207 to the sixth cavity 166.

In still another embodiment, the second turbine rotor 120 further defines a fourth longitudinal portion 154 extended radially adjacent to the annular shroud 205 of the first turbine frame 210. One or more bearing assemblies 200 are coupled to the annular shroud 205 and the fourth longitudinal portion 154 and disposed therebetween.

In another embodiment, the first turbine frame 210 further defines a lube housing assembly 203 extended along the longitudinal direction L. The lube housing assembly 203 may be defined radially inward of the fourth longitudinal portion 154 of the second turbine rotor 120. The lube housing assembly 203 may further be defined radially inward of the speed reduction assembly 300. The lube housing assembly 203 may further be defined annularly around the axial centerline 12. The driveshaft 36 is extended generally radially within the lube housing assembly 203.

In various embodiments, at least a portion of the first supply conduit 211 is defined through the lube housing assembly 203. The lube housing assembly 203 may further be coupled to the speed reduction assembly 300, such as to provide fluid communication of the flow of fluid 216 (e.g., oil, lubricant, etc.) to the speed reduction assembly 300 extended along the longitudinal direction L.

In various embodiments, a fourth cavity 164 is defined between the lube housing assembly 203, the speed reduction assembly 300, and the fourth longitudinal portion 154 of the second turbine rotor 120. In one embodiment, the fourth longitudinal portion 154 defines a fourth opening 174 defined therethrough. The fourth opening 174 provides fluid communication of the flow of fluid 216 from the fourth cavity 164 to the bearing assembly 200 disposed between the first turbine frame 210 and the fourth longitudinal portion 154 of the second turbine rotor 120.

In yet another embodiment, a fifth cavity 165 is defined between the annular shroud 205 of the first turbine frame 210, the fourth longitudinal portion 154 of the second turbine rotor 120, and the one or more bearing assemblies 200 therebetween. In one embodiment, the first scavenge conduit 212 is defined from the fifth cavity 165 and through one or more struts 215 of the first turbine frame 210.

In still various embodiments, the engine 10 defines at least in part, a lube conduit from the first supply conduit 211 to the speed reduction assembly 300, from the speed reduction assembly 300 to the third cavity 163 through the third opening 173 of the third longitudinal portion 153 of the second turbine rotor 120, from the third cavity 163 to the second cavity 162, from the second cavity 162 to the first cavity 161 via the first opening 171 at the first longitudinal portion 151, and through the first scavenge conduit 221. In another embodiment, the engine 10 further defines, at least in part, the lube conduit from the first supply conduit 211 to the fourth cavity 164, from the fourth cavity 164 through the fourth opening 174 through the fourth longitudinal portion 154 of the second turbine rotor 120 to the one or more bearing assemblies 200 defined between the annular shroud 205 of the first turbine frame 210 and the fourth longitudinal portion 154, and from the fifth cavity 165 to the first scavenge conduit 212.

In yet various embodiments, the engine 10 defines along the core flowpath 70, in serial arrangement along the longitudinal direction L from the upstream end 99 to a downstream end 98, the first turbine frame 210, one or more iterations of the second turbine rotor 120 and the first turbine rotor 110 along the longitudinal direction L, and the second turbine frame 220. In one embodiment, the engine 10 defines the plurality of structural members 116 of the rotatable frame 119 upstream of the second turbine frame 220 and downstream of the second turbine rotor 120.

The lube system arrangement defined by one or more combinations of the first supply conduit 211, the first scavenge conduit 212, the first pressure supply conduit 213, the second scavenge conduit 221, the second pressure supply conduit 222, and the cavities 161, 162, 163, 164, 165, 166 therein provide an arrangement to provide and egress oil or another lubricant to the speed reduction assembly 300 and the plurality of bearing assemblies 200 of an interdigitated counter-rotating turbine rotor assembly 95. The lube system arrangement, disposed at the downstream end 98 of the engine 10 and turbine section 90, provides simplified access, inspection, and maintainability in contrast to forward-mounted speed reduction assemblies (e.g., within a fan assembly or compressor section). Still further, one or more of the cavities, such as the fourth cavity 164, the third cavity 163, the second cavity 162, and/or the first cavity 161, defines a relatively compact sump, thereby reducing complexity, cost, weight, and packaging, thereby enabling smaller speed reduction assemblies 300 within the turbine section 90. Still further, the lube arrangement generally provided herein provides oil or another lubricant to the pluralities of bearing assemblies 200 and the speed reduction assembly 300 via the first turbine frame 210, thereby reducing complexity, losses, or potential points of failure at the engine 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine, comprising:
   a first turbine frame defining at least one first strut extending along a radial direction; and
   a turbine rotor assembly defining a rotatable drum, the rotatable drum surrounding a speed reduction assembly and coupled thereto,
   wherein the turbine rotor assembly comprises a first turbine rotor and a second turbine rotor, each disposed on one or more bearing assemblies,
   wherein the at least one first strut is positioned forward of the speed reduction assembly, wherein the first turbine frame defines a first supply conduit extending through the at least one first strut and providing a flow of lubrication fluid to the speed reduction assembly and the one or more bearing assemblies, and
   wherein the first turbine frame further defines a first scavenge conduit extending through the at least one first strut, the first scavenge conduit providing an egress of at least a first portion of the flow of lubrication fluid from the one or more bearing assemblies.

2. The gas turbine engine of claim 1, further comprising:
   a second turbine frame defining at least one second strut extending along the radial direction, wherein the second turbine frame defines a second scavenge conduit providing an egress of at least a second portion of the flow of lubrication fluid from the one or more bearing assemblies and the speed reduction assembly,
   wherein the second turbine frame further defines a pressure supply conduit providing a flow of gas therethrough,
   wherein the gas turbine engine defines a core flowpath, and
   wherein the first turbine frame and the second turbine frame each extend through the core flowpath.

3. The gas turbine engine of claim 2,
   wherein the pressure supply conduit defined by the second turbine frame is a second pressure supply conduit with respect to a first pressure supply conduit defined by the first turbine frame, the first pressure supply conduit extending at least partially through the first turbine frame,
   wherein the first supply conduit provides the flow of lubrication fluid,
   wherein the first pressure supply conduit provides a first flow of gas, and
   wherein the second pressure supply conduit provides a second flow of gas.

4. The gas turbine engine of claim 2, wherein the second turbine frame and the rotatable drum of the turbine rotor assembly together define a forward seal assembly, an aft seal assembly, and a first cavity located between the forward seal assembly and the aft seal assembly along a longitudinal direction of the gas turbine engine, and between an inner diameter of the second turbine frame and the rotatable drum of the turbine rotor assembly along the radial direction of the gas turbine engine.

5. The gas turbine engine of claim 4, wherein the pressure supply conduit defined by the second turbine frame is a second pressure supply conduit with respect to a first pressure supply conduit defined by the first turbine frame, the first pressure supply conduit extending at least partially through the first turbine frame,
wherein the forward seal assembly and the aft seal assembly each define a high pressure side outside of the first cavity and a low pressure side inside of the first cavity, and
wherein the second pressure supply conduit provides pressurized gas to the high pressure side.

6. The gas turbine engine of claim 4,
wherein the rotatable drum of the turbine rotor assembly defines a first longitudinal portion at least partially circumferentially surrounding the speed reduction assembly, and
wherein the first longitudinal portion defines a first opening therethrough providing fluid communication from one or more of the speed reduction assembly and the one or more bearing assemblies to the first cavity between the forward seal assembly and the aft seal assembly.

7. The gas turbine engine of claim 6, wherein the first opening in the first longitudinal portion of the rotatable drum defines an inner diameter opening and an outer diameter opening.

8. The gas turbine engine of claim 7, wherein the inner diameter opening is defined at a different circumferential position along the first longitudinal portion of the rotatable drum relative to the outer diameter opening, thereby defining an at least partially circumferential or tangential opening passage therebetween.

9. The gas turbine engine of claim 4, wherein the forward seal assembly defines a first forward seal and a second forward seal, wherein the first forward seal is forward of the second forward seal, wherein a forward seal cavity is defined therebetween, and
wherein the first cavity is located between the second forward seal and the aft seal assembly along the longitudinal direction of the gas turbine engine.

10. The gas turbine engine of claim 9, wherein the first turbine rotor of the turbine rotor assembly comprises a rotatable frame, the rotatable frame comprising a plurality of radially extending members and an outer shroud extending along the longitudinal direction of the gas turbine engine,
wherein a plurality of outer shroud airfoils are extending inward along the radial direction of the gas turbine engine from the outer shroud, and
wherein the rotatable drum is coupled to the rotatable frame and is positioned at least partially inward of the rotatable frame along the radial direction.

11. The gas turbine engine of claim 10, wherein the rotatable drum further defines a longitudinal portion coupled to the speed reduction assembly.

12. The gas turbine engine of claim 1, wherein a cavity is defined between the rotatable drum and the speed reduction assembly.

13. The gas turbine engine of claim 12, wherein the second turbine rotor of the turbine rotor assembly defines an input shaft coupled to the speed reduction assembly.

14. The gas turbine engine of claim 12, wherein the second turbine rotor of the turbine rotor assembly defines a longitudinal portion, and
wherein the longitudinal portion defines an opening defined therethrough, the opening providing fluid communication from the cavity to the one or more bearing assemblies.

15. The gas turbine engine of claim 14, wherein the longitudinal portion is a second longitudinal portion with respect to a first longitudinal portion of the rotatable drum,
wherein the cavity is a first cavity with respect to a second cavity defined between the first and second longitudinal portions.

16. The gas turbine engine of claim 1,
wherein the second turbine rotor of the turbine rotor assembly further defines a longitudinal portion defined radially adjacent to an annular shroud of the first turbine frame, and
wherein the one or more bearing assemblies are coupled to the annular shroud and the longitudinal portion, and disposed therebetween.

17. The gas turbine engine of claim 16, wherein the first turbine frame of the turbine rotor assembly further defines a lube housing assembly extending along a longitudinal direction of the gas turbine engine, the lube housing assembly disposed radially inward of the longitudinal portion of the second turbine rotor and the speed reduction assembly and the one or more bearing assemblies,
wherein at least a portion of the first supply conduit extends through the lube housing assembly,
wherein a cavity is defined between the speed reduction assembly and the longitudinal portion of the second turbine rotor, and
wherein the longitudinal portion of the second turbine rotor defines an opening defined therethrough, the opening providing fluid communication from the cavity to the one or more bearing assemblies.

18. A gas turbine engine defining a radial direction and a longitudinal direction, the gas turbine engine comprising:
a turbine section defining a core flowpath, the turbine section comprising a turbine rotor assembly comprising a gearbox, a first turbine rotor, and a second turbine rotor, at least one of the first turbine rotor and the second turbine rotor coupled to the gearbox;
a first turbine frame comprising a first strut extending along the radial direction through the core flowpath, the first strut positioned forward of the gearbox, the first turbine frame defining a first supply conduit extending through the first strut to provide a flow of lubrication fluid to the gearbox, the first turbine frame further defining a first scavenge conduit extending through the first strut to provide an egress of at least a first portion of the flow of lubrication fluid from the gearbox; and
a second turbine frame comprising a second strut extending along the radial direction through the core flowpath at a location spaced from the first strut along the longitudinal direction,
wherein the second turbine frame defines a second scavenge conduit providing an egress of at least a second portion of the flow of lubrication fluid from the gearbox.

19. The gas turbine engine of claim 18, wherein the first turbine frame further defines a first pressure supply conduit extending at least partially therethrough, wherein the second turbine frame further defines a second pressure supply conduit extending at least partially therethrough, wherein the first supply conduit provides the flow of lubrication fluid, wherein the first pressure supply conduit provides a first flow of gas, and wherein the second pressure supply conduit provides a second flow of gas.

20. The gas turbine engine of claim 18, wherein the first turbine rotor comprises a plurality of first turbine rotor airfoils, wherein the second turbine rotor comprises a plurality of second turbine rotor airfoils, wherein the first strut of the first turbine frame extends through the core flowpath at a location forward of the first and second turbine airfoils, and wherein the second strut of the second turbine frame extends through the core flowpath at a location aft of the first and second turbine airfoils.

\* \* \* \* \*